United States Patent
Majdabadi et al.

(10) Patent No.: US 11,687,627 B2
(45) Date of Patent: Jun. 27, 2023

(54) MEDIA TRANSIT MANAGEMENT IN CYBERSPACE

(71) Applicant: INTERNATIONAL BUSINESS MACHINES CORPORATION, Armonk, NY (US)

(72) Inventors: Hamid Majdabadi, Ottawa (CA); Ravithej Chikkala, Pflugerville, TX (US); Su Liu, Austin, TX (US); Manjunath Ravi, Austin, TX (US)

(73) Assignee: INTERNATIONAL BUSINESS MACHINES CORPORATION

( * ) Notice: Subject to any disclaimer, the term of this patent is extended or adjusted under 35 U.S.C. 154(b) by 193 days.

(21) Appl. No.: 17/392,814

(22) Filed: Aug. 3, 2021

(65) Prior Publication Data
US 2023/0039068 A1 Feb. 9, 2023

(51) Int. Cl.
*G06F 21/16* (2013.01)
*G06F 16/583* (2019.01)
(Continued)

(52) U.S. Cl.
CPC ............ *G06F 21/16* (2013.01); *G06F 16/583* (2019.01); *G06F 16/587* (2019.01); *G06F 21/6272* (2013.01)

(58) Field of Classification Search
CPC .... G06F 21/16; G06F 21/6272; G06F 16/583; G06F 16/587
(Continued)

(56) References Cited

U.S. PATENT DOCUMENTS 7,783,767 B2 8/2010 Collazo
8,718,633 B2 5/2014 Sprigg
(Continued)

FOREIGN PATENT DOCUMENTS

EP 1665717 B1 6/2006
TW 200731113 A 8/2007

OTHER PUBLICATIONS

Smarsh, "Content capture and management solutions for the modern workforce," Smarch.com, [accessed Apr. 6, 2021], Retrieved from the Internet: https://www.smarsh.com/products/connected-capture/, 6 pages.
(Continued)

*Primary Examiner* — Michael S McNally
(74) *Attorney, Agent, or Firm* — Robert R. Aragona

(57) ABSTRACT

An embodiment for media transit management is provided. The embodiment may include receiving one or more images and one or more pre-set configuration criteria regarding management of an image file. The embodiment may also include monitoring for an attempted sharing of the image file. The embodiment may further include in response to determining each object in the one or more images matches each object in the image file, identifying at least one other user who is attempting to share the image file. The embodiment may also include in response to determining the at least one other user is not authorized to share the image file, analyzing the one or more pre-set configuration criteria correlated with the image file. The embodiment may further include in response to determining the image file does not meet the one or more pre-set configuration criteria, prompting the participating user to respond to a notification.

20 Claims, 8 Drawing Sheets

(51) Int. Cl.
    *G06F 16/587*     (2019.01)
    *G06F 21/62*     (2013.01)

(58) Field of Classification Search
    USPC .......................................................... 726/27
    See application file for complete search history.

(56) References Cited

U.S. PATENT DOCUMENTS

| | | | |
|---|---|---|---|
| 8,887,290 B1* | 11/2014 | Denton | G06F 21/10 |
| | | | 726/26 |
| 9,043,944 B2 | 5/2015 | Ronaldi | |
| 9,208,452 B2 | 12/2015 | Wilbrink | |
| 9,363,481 B2 | 6/2016 | Grigorovitch | |
| 9,485,206 B2 | 11/2016 | Day, II | |
| 10,305,977 B2 | 5/2019 | Chakra | |
| 10,659,529 B2 | 5/2020 | Chakra | |
| 2006/0136379 A1* | 6/2006 | Marino | G06F 16/583 |
| | | | 707/E17.02 |
| 2009/0154806 A1* | 6/2009 | Chang | G06V 20/48 |
| | | | 382/173 |
| 2011/0103696 A1* | 5/2011 | Mizuno | H04N 1/00159 |
| | | | 382/181 |
| 2015/0112997 A1* | 4/2015 | Kim | G06F 16/58 |
| | | | 707/741 |
| 2015/0286651 A1* | 10/2015 | Greene | G06F 21/16 |
| | | | 707/722 |
| 2017/0357876 A1* | 12/2017 | Rothschild | G06F 16/583 |

OTHER PUBLICATIONS

Alashkar et al., "Examples-Rules Guided Deep Neural Network for Makeup Recommendation," Proceedings of the Thirty-First AAAI Conference on Artificial Intelligence (AAAI-17), 2017, pp. 941-947.

Candela, "Managing Your Identity on Facebook With Face Recognition Technology," Facebook, Dec. 19, 2017, Retrieved from the Internet: https://about.fb.com/news/2017/12/managing-your-identity-on-facebook-with-face-recognition-technology/, 7 pages.

Carlsson et al., "Automatic detection of images containing nudity—Image detection using artificial neural networks and statistical methods," IT University of Goteborg, Chalmers, Master thesis in Intelligent Systems Design, 2008, Retrieved from the Internet: https://publications.lib.chalmers.se/records/fulltext/76159.pdf, 53 pages.

Davis, "Detecting Non-Consensual Intimate Images and Supporting Victims," Facebook, Mar. 15, 2019, Retrieved from the Internet: https://about.fb.com/news/2019/03/detecting-non-consensual-intimate-images/, 5 pages.

European Union, the European Parliament, "Directive of the European Parliament and of the Council," Brussels, Oct. 12, 2018, PE-CONS 33/18, Retrieved from the Internet: https://data.consilium.europa.eu/doc/document/PE-33-2018-INIT/en/pdf, 89 pages.

Online Sense, "How to Make Use of the Report Button on Facebook (2017)," Jan. 20, 2016, Retrieved from the Internet: https://onlinesense.org/facebook-report-abuse/, 14 pages.

Tran et al., "Privacy-CNH: A Framework to Detect Photo Privacy with Convolutional Neural Network Using Hierarchical Features," Proceedings of the Thirtieth AAAI Conference on Artificial Intelligence (AAAI-16), 2016, Retrieved from the Internet: https://www.aaai.org/ocs/index.php/AAAI/AAAI16/paper/download/12232/11739, pp. 1317-1323.

Mell et al., "The NIST Definition of Cloud Computing", Recommendations of the National Institute of Standards and Technology, NIST Special Publication 800-145, Sep. 2011, 7 pages.

Iyengar, "A Research-Based Approach to Protecting Intimate Images", Facebook, Mar. 15, 2019, 7 Pages. https://about.fb.com/news/2019/03/protecting-intimate-images/.

* cited by examiner

US 11,687,627 B2

MEDIA TRANSIT MANAGEMENT IN CYBERSPACE

BACKGROUND

The present invention relates generally to the field of computing, and more particularly to a system for managing media transit in cyberspace.

Sharing images to a boundless online audience in social media and other digital landscapes, such as instant messaging applications, blogging platforms, and comments sections of websites has recently emerged as an area of concern. Such sharing may include disseminating, publishing, distributing, and/or posting images taken by another person without the consent of that other person. Studies have suggested that one out of every 25 Americans, i.e., approximately 10.4 million people, has had an image shared, and this number is expected to rise as society becomes increasingly internet-centric.

SUMMARY

According to one embodiment, a method, computer system, and computer program product for managing media transit in cyberspace is provided. The embodiment may include receiving, from a participating user, one or more images and one or more pre-set configuration criteria regarding management of an image file. The one or more images may contain objects and metadata. The metadata may include at least a time stamp and location where the one or more images were captured. The embodiment may also include receiving a request from the participating user to monitor for an attempted sharing of the image file by at least one other user. The embodiment may further include monitoring for the attempted sharing of the image file in response to receiving the request from the participating user. The embodiment may also include in response to determining each object in the one or more images matches each object in the image file and the time stamp and location of the one or more images match a time stamp and location of the image file, identifying the at least one other user who is attempting to share the image file and correlating the one or more pre-set configuration criteria with the image file. The embodiment may further include in response to determining the at least one other user is not authorized to share the image file based on the one or more pre-set configuration criteria, analyzing the one or more pre-set configuration criteria correlated with the image file. The embodiment may also include in response to determining the image file does not meet the one or more pre-set configuration criteria for sharing, prompting the participating user to respond to a notification regarding the attempted sharing.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
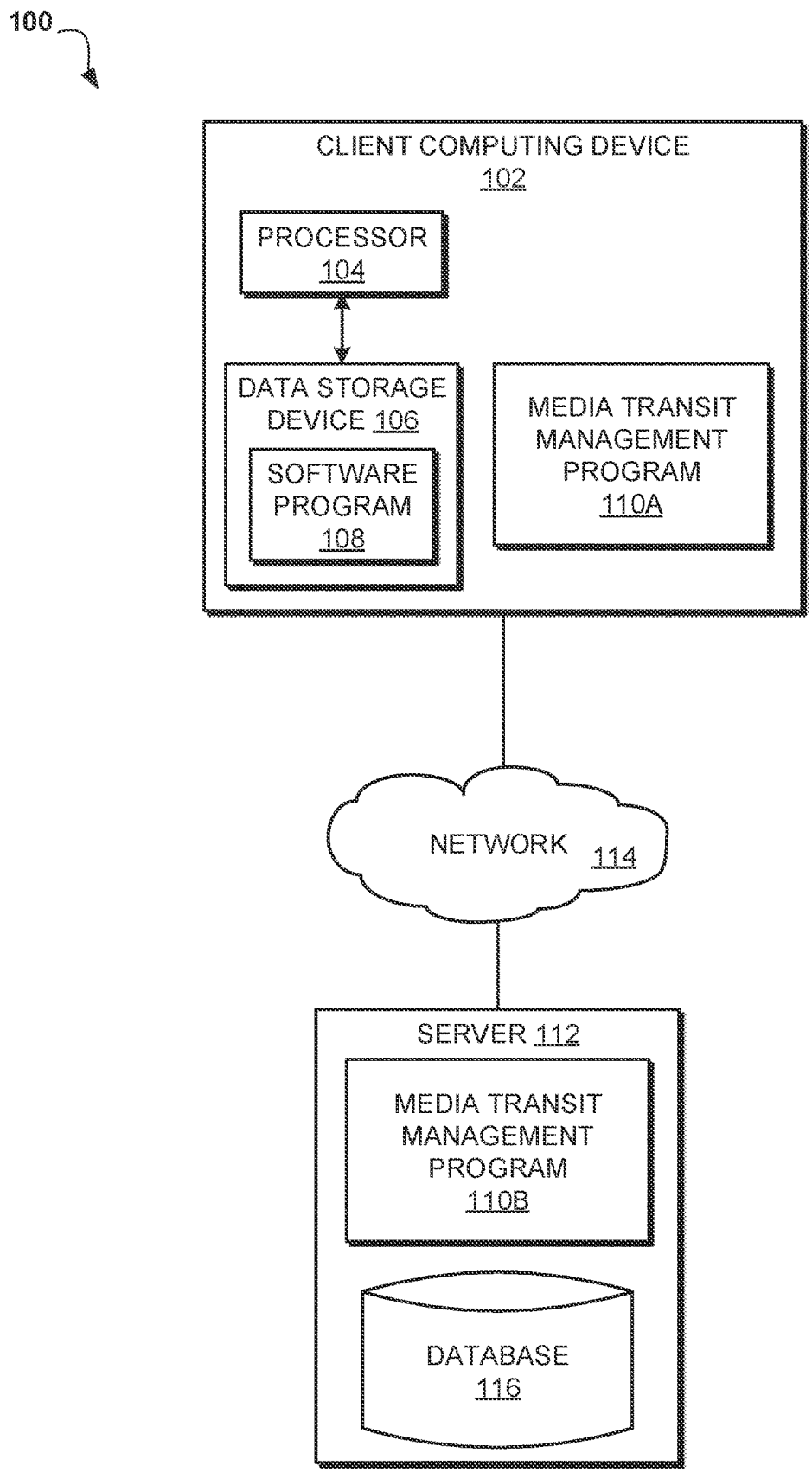
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to a system for managing media transit in cyberspace. The following described exemplary embodiments provide a system, method, and program product to, among other things, receive a pre-set configuration from a participating user regarding management of an image file and, accordingly, notify the participating user of an attempt by at least one other user to share the image file if the image file does not meet the pre-set configuration criteria. Therefore, the present embodiment has the capacity to improve the technical field of media transit management by preventing the posting of an image in transit, thus averting unwanted sharing activity. Also, some embodiments of the present invention have the capacity to improve a computer by presenting to the participating user a flexible and easy-to-understand graphical user interface (GUI).

As previously described, sharing images to a boundless online audience in social media and other digital landscapes, such as instant messaging applications, blogging platforms, and comments sections of websites has recently emerged as an area of concern, for privacy reasons, copyrights, etc. Such sharing may include disseminating, publishing, distributing, and/or posting images taken by another person without the consent of the other person. Studies have suggested that one out of every 25 Americans, i.e., approximately 10.4 million people, has had an image shared, and this number is expected to rise as society becomes increasingly internet-centric.

It is often difficult to track attempts by a person to upload an image taken by another person without the consent of the other person. For example, a person may not want a particular image shared, and someone else may be attempting to share that image online in an unwanted manner. This problem is typically addressed by notifying the person who took the image after someone else has shared the image on certain social media sites. However, such notifications are reactive in nature and fail to intervene before the image is shared in the first place. It may therefore be imperative to have a system in place for participating users to register, track, and custom control their media transition in an online environment. Thus, embodiments of the present invention may provide advantages including, but not limited to, enabling a participating user to choose options to manage their online media, allowing the participating user to update the media management options anytime via a GUI, and protecting the privacy of the participating user. The present invention does not require that all advantages need to be incorporated into every embodiment of the invention.

According to at least one embodiment, when a participating user is seeking privacy in an online environment, the participating user may upload one or more images or provide a link to their social media account images and set one or more configuration criteria regarding management of an image file. For example, the participating user may not want another user to share an image taken by the participating user. These images may contain objects and metadata. In response to receiving a request from the participating user, the attempted sharing of the image file by at least one other user may be monitored so that the image file is not shared until the management criteria is met. According to at least one embodiment, the pre-set configuration criteria may be a set of rules defined by the participating user for sharing the image file, described in further detail below with respect to FIGS. 2A and 2B. In response to determining each object in the one or more images matches each object in the image file and a time stamp and location of the one or more images match a time stamp and location of the image file, the at least one other user who is attempting to share the image file may be identified in order to determine whether the at least one other user is authorized to share the image file. If the at least one other user is not authorized to share the image file, the configuration criteria correlated with the image file may be analyzed in order to determine whether the image file meets the criteria for sharing. If the image file does not meet the criteria for sharing, a notification may be sent to the participating user prompting the participating user to accept the sharing of the image file, deny the sharing of the image file, or specify that the image file does not contain an image taken by an individual.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to receive a pre-set configuration from a participating user regarding management of an image file and, accordingly, notify the participating user of an attempt by at least one other user to share the image file if the image file does not meet the pre-set configuration criteria.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a media transit management program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 5, the client computing device 102 may include internal components 502a and external components 504a, respectively.

The server 112 may be a laptop computer, netbook computer, personal computer (PC), a desktop computer, or any programmable electronic device or any network of programmable electronic devices capable of hosting and running a media transit management program 110B and a database 116 and communicating with the client computing device 102 via the communication network 114, in accordance with embodiments of the invention. As will be discussed with reference to FIG. 5, the server 112 may include internal components 502b and external components 504b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the media transit management program 110A, 110B may be a program capable of receiving a pre-set configuration from a participating user regarding management of an image file, determining whether each object in the one or more images matches each object in the image file, and determining whether the time stamp and location of the one or more images match the time stamp and location of the image file. In addition, the media transit management program 110A, 110B may notify the participating user of an attempt by at least one other user to share the image file if the image file does not meet the pre-set configuration criteria, therefore protecting the privacy of the participating user. The media transit management method is explained in further detail below with respect to FIGS. 2A and 2B.

Figure 2A:
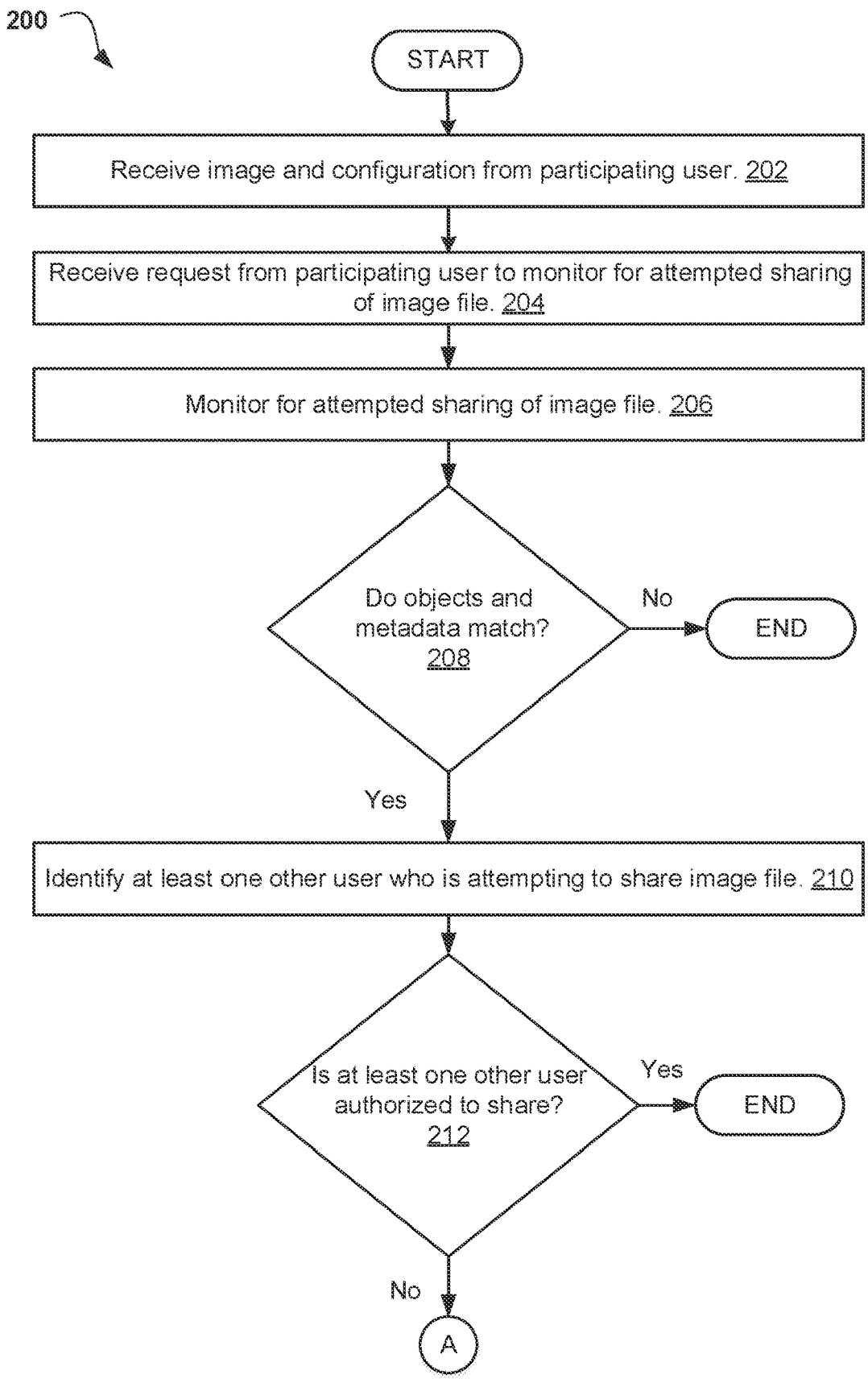
FIGS. 2A and 2B illustrate an operational flowchart for managing media transit in cyberspace in a media transit management process according to at least one embodiment.
Figure 2B:
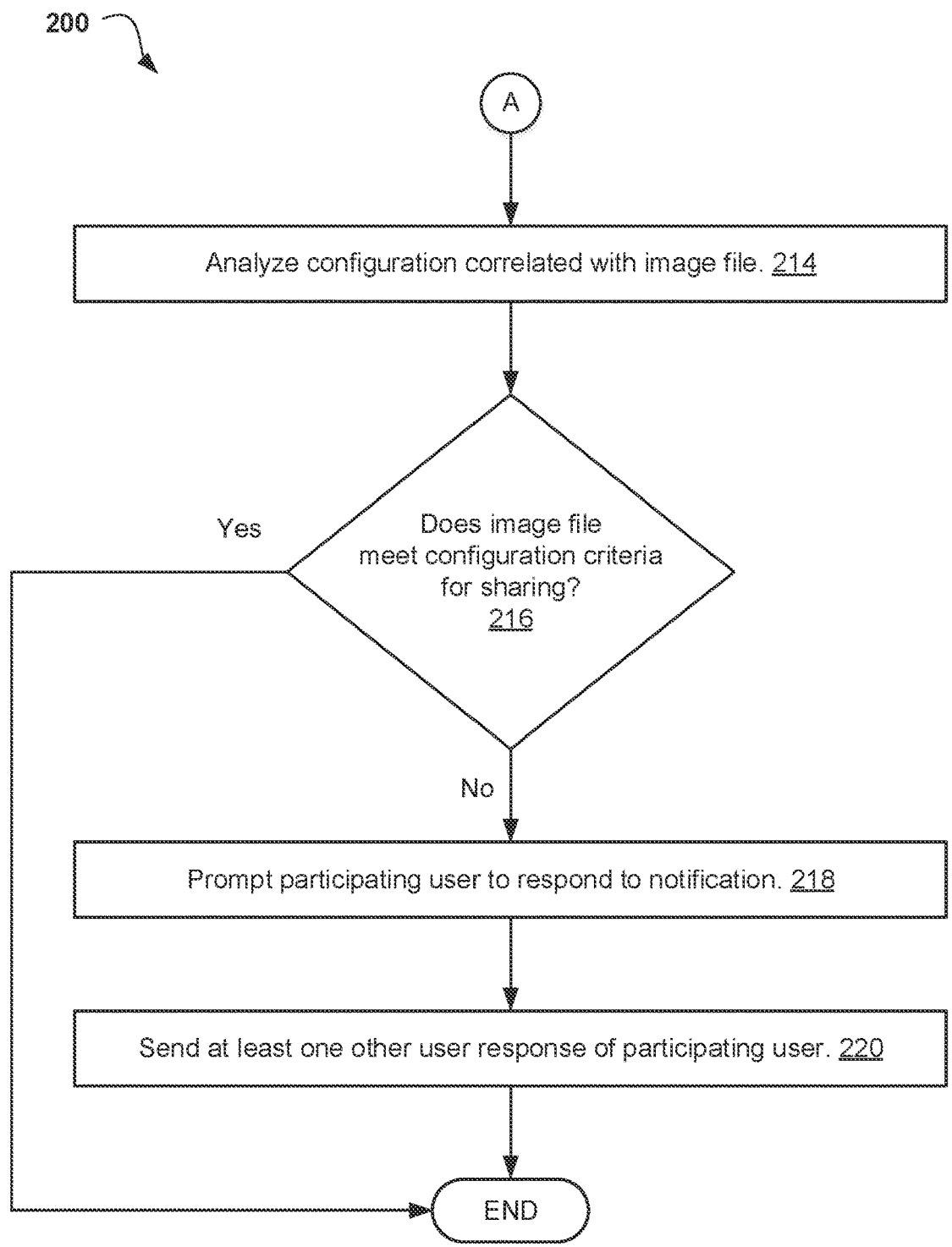

Referring now to FIGS. 2A and 2B, an operational flowchart for managing media transit in cyberspace in a media transit management process 200 is depicted according to at least one embodiment. At 202, the media transit management program 110A, 110B receives from the participating user the one or more images and the one or more pre-set configuration criteria regarding management of an image file. The one or more images contain objects and metadata. The metadata includes the time stamp and location where the one or more images were captured. As used herein, "participating user" means a user who is seeking to manage the sharing of an image file by another individual (i.e., the at least one other user). The image file may contain, for example, material that the participating user does not want to be shared online.

According to at least one embodiment, utilizing the software program 108 (FIG. 1) on the client computing device 102 (FIG. 1), the media transit management program 110A, 110B may receive the one or images that are uploaded by the participating user. For example, the participating user may upload at least one image which contains a street sign in the background and metadata that includes a time stamp that the image was captured on Jan. 31, 2020. The objects may include, but are not limited to, a couch, a bed, a table, an entertainment system (e.g., stereo or TV), pets, and/or any other objects which can be recognized in images. The metadata and objects associated with the at least one image may then be used to track the sharing of the image file by the at least one other user. For example, the metadata may include information about the one or more received images including, but not limited to, a time and location the image was taken, an ID of the device that captured the image (e.g., IMEI number), and a size of the image (e.g., in bits). According to at least one other embodiment, the media transit management program 110A, 110B may receive the one or more images that contain metadata from a social media account of the participating user if the participating user gives permission to access their social media account. For example, many social media platforms contain a plurality of pictures and/or videos which may be accessed by the media transit management program 110A, 110B if the participating user provides a link to the pictures and/or videos page of their social media account. The metadata associated with the one or more images may be stored in a database, such as database 116 (FIG. 1). It may also be appreciated that the received images may be updated at any time, either manually by the participating user or by uploading additional photos and/or videos to a linked social media account. Additionally, the database may be linked to any participating network including, but not limited to, all social media networks, blogs and websites, email services, instant messaging services, and/or any other platform capable of sharing and distributing media.

According to at least one embodiment, also utilizing the software program 108 (FIG. 1) on the client computing device 102 (FIG. 1), the media transit management program 110A, 110B may receive the one or more pre-set configuration criteria regarding the management of the image file. The participating user may register via a secured registration platform (SRP) and create a profile, described in further detail below with respect to FIG. 3, and this profile may contain the pre-set configuration criteria. In order to register via the SRP, the participating user must give consent to monitor for an attempted sharing of the image file. Additionally, this profile may also be stored in the database, such as database 116 (FIG. 1), or in a cloud-based repository, described in further detail below with respect to FIGS. 6 and 7. As described above, the pre-set configuration criteria may be a set of rules defined by the participating user for sharing the image file.

Examples of this configuration criteria include, but are not limited to:

Block the attempted sharing if the image file was captured in a public place (e.g., many image files have metadata such as location tags and the participating user may designate certain locations to block or allow sharing);

Block the attempted sharing if the image file is embedded with a particular geolocation (e.g., at a concert, swimming pool, someone's house and/or any other particular location);

Block the attempted sharing if the image file was not captured by a known device (e.g., a known device may be identified by an IMEI number of a smartphone or serial number of another device);

Block the attempted sharing of any image file with a specific time stamp or a range of a period (e.g., embedded in the image file);

Allow the attempted sharing if the at least one other user is in a contact list of the participating user (e.g., phone and/or social media contacts of the participating user);

Allow the attempted sharing only after approval is granted by the participating user (e.g., send a notification to the participating user whenever the image file is shared by the at least one other user); and If in doubt about whether each object in the one or more images matches each object in the image file, send a notification to the participating user for review (e.g., if less than 60% confident, send a notification to the participating user).

According to at least one other embodiment, the participating user may set, as a part of the configuration criteria, a threshold confidence level regarding the management of the image file. For example, the participating user may set the threshold confidence level to at least 60%. The threshold confidence level is described in further detail below with respect to step 216.

Then, at 204, the media transit management program 110A, 110B receives the request form the participating user to monitor for an attempted sharing of the image file by the at least one other user. The request may be received by the media transit management program 110A, 110B through the SRP described above with respect to step 202. The request may be considered an agreement by the participating user to allow for the monitoring of uploads and sharing of the image file by the at least one other user. The request may also be considered an agreement by the participating user to allow for the correlation of the one or more pre-set configuration criteria with the image file that is attempted to be shared. The correlation may simply associate each pre-set configuration criteria with the image file that is attempted to be shared.

Next, at 206, the media transit management program 110A, 110B monitors for the attempted sharing of the image file. The monitoring may occur in response to receiving the request from the participating user. The media transit management program 110A, 110B may be an event-based trigger acting as a plug-in or add-on bridge capable of communicating with the database containing the metadata associated with the one or more received images and the participating user profile. The monitoring may be performed by comparing the objects in the one or more images with the objects in the image file and comparing the metadata associated with the one or more images with the metadata of the image file attempted to be shared. For example, a table in the one or more images may be matched with a table in the image file. Thus, any image file attempted to be shared may be held in a pending state until the pre-set configuration criteria for sharing the image file is met. For example, if each object in the one or more images matches each object in the image file, and the time stamp and location of the one or more images match the time stamp and location of the image file, the image file may then be correlated with the one or more pre-set configuration criteria.

Then, at 208, the media transit management program 110A, 110B determines whether each object in the one or more images matches each object in the image file and whether the time stamp and location of the one or more images match the time stamp and location of the image file. The determination is made based on the metadata associated with the one or more received images. For example, in one embodiment, the participating user may tag objects in the one or more images. In another embodiment, the media transit management program 110A, 110B may use computer vision techniques to identify objects that have not been tagged. These objects may then be stored with the image as metadata. As described above with respect to step 206, the metadata of the image file may be compared with the metadata associated with the one or more images. For example, an object identified in the one or more images may be identified in the one or more images but not the image file, or may be identified in the one or more images and the image file. In response to determining each object in the one or more images matches each object in the image file and the time stamp and location of the one or more images match the time stamp and location of the image file (step 208, "Yes" branch), the media transit management process 200 proceeds to step 210 to identify the at least one other user who is attempting to share the image file. In response to determining an object in the one or more images does not match an object in the image file, or the time stamp and location of the one or more images do not match the time stamp and location of the image file (step 208, "No" branch), the media transit management process 200 ends, since there is no restriction on the sharing of the image file.

Next, at 210, the media transit management program 110A, 110B identifies the at least one other user who is attempting to share the image file. As use herein, "at least one other user" is another individual (i.e., an individual who is neither the participating user nor anyone whom the participating user adds to a trusted user list the participating user profile) who is attempting to share the image file containing an image belonging to the participating user. The at least one other user may be identified utilizing text on an account of the at least one other user. For example, if the at least one other user is attempting to upload an image file to their social media account, the identification may be obtained from text on the social media profile of the at least one other user, such as a social media handle and/or screenname.

Then, at 212, the media transit management program 110A, 110B determines whether the at least one other user is authorized to share the image file. The determination may be made based on the one or more pre-set configuration criteria. For example, as described above with respect to step 202, the pre-set configuration criteria may specify when to block and when to allow an attempted sharing of the image file. Continuing the example, if the participating user allows one of their phone and/or email contacts to share the image file, if the at least one other user is included in those contacts, the at least one other user may be authorized to share the image file. Similarly, if the at least one other user captured the image file using an unknown device (e.g., a device whose IMEI number is not recognized in the participating user profile), the at least one other user may not be authorized to share the image file. In embodiments where the attempted sharing is only allowed after approval is granted by the participating user, it may be determined that the at least one other user is not authorized to share the image file. In response to determining the at least one other user is not authorized to share the image file (step 212, "No" branch), the media transit management process 200 proceeds to step 214 to analyze the one or more pre-set configuration criteria correlated with the image file. In response to determining the at least one other user is authorized to share the image file (step 212, "Yes" branch), the media transit management process 200 ends, since if the at least one other user is authorized there is no restriction on the sharing of the image file.

Next, at 214, the media transit management program 110A, 110B analyzes the one or more pre-set configuration criteria correlated with the image file. The media transit management program 110A, 110B may access the participating user profile and utilize natural language processing (NLP) to analyze each pre-set configuration criteria. Upon analyzing each pre-set configuration criteria, the image file may be scanned to determine whether the image file meets the one or more pre-set configuration criteria for sharing, described in further detail below with respect to step 216.

Then, at 216, the media transit management program 110A, 110B determines whether the image file meets the one or more pre-set configuration criteria for sharing by the at least one other user. The determination may be made based on the analysis of the one or more pre-set configuration criteria correlated with the image file. For example, if one pre-set criterion includes blocking attempted sharing if the image file was not captured by a known device, that criterion may be analyzed and the image file may be scanned for metadata referring to the IMEI of a smartphone or the serial number of a camera. Alternatively, if another pre-set criterion includes blocking the sharing of an image file when the image file was captured in a public place, that criterion may be analyzed and the image file may be scanned for metadata referring to the location and/or time. As described above with respect to step 202, the participating user may set a threshold confidence level regarding the management of the image file. It may be difficult in certain circumstances to determine whether the image file meets the one or more pre-set configuration criteria for sharing (e.g., the image file is blurry or an object has not been tagged). Thus, a confidence score may be assigned when correlating the image file with the one or more pre-set configuration criteria. If the confidence score falls below the threshold confidence level set by the participating user (e.g., a 60% threshold confidence level that the image file meets the pre-set configuration criteria), the notification may be sent to the participating user. In response to determining the image file does not meet the one or more pre-set configuration criteria for sharing (step 216, "Yes" branch), the media transit management process 200 proceeds to step 218 to prompt the participating user to respond to the notification. In response to determining the image file meets the one or more pre-set configuration criteria for sharing (step 216, "Yes" branch), the media transit management process 200 ends, since the criteria is met and thus there is no further restriction on the sharing of the image file.

Next, at 218, the media transit management program 110A, 110B prompts the participating user to respond to the notification regarding the attempted sharing. The notification may be presented to the participating user via the GUI, described in further detail below with respect to FIG. 4. As described above with respect to step 202, according to at least one embodiment, the notification may also be sent to the participating user whenever the image file is shared by the at least one other user, regardless of whether the pre-set configuration criteria is met. The notification may include details of the sharing activity by the at least one other user, including, but not limited to, the particular image file being shared and the platform with which the image file will be shared. According to at least one other embodiment, the details of the sharing activity may be stored in the profile of the participating user for future analysis. These details may be added to the machine learning (ML) process of the provider to learn after each notification response, and update the participating user profile to enhance future accuracy and prevent duplication of notifications. For example, if the identity of the at least one other user is stored, if that same other user attempts to share the same image file again, the attempted sharing may be blocked or allowed based on the previously analyzed pre-set configuration criteria. In addition, the participating user may be prompted to tag the objects in the image file if the media transit management program 110A, 110B is not confident as to the identification of the object.

Then, at 220, the media transit management program 110A, 110B sends the at least one other user the response of the participating user. As described above with respect to step 218, the notification may be presented to the participating user via the GUI, and the participating user may allow or block the attempted sharing of the image file, described in further detail below with respect to FIG. 4. If the participating user allows the sharing of the image file, the at least one other user may receive a notification that the sharing is allowed and may proceed to upload the image file. Contrarily, if the participating user blocks the sharing of the image file, the at least one other user may receive a notification that the sharing is blocked and will be prohibited from uploading the image file. According to at least one embodiment, if the sharing is prohibited, the unauthorized sharing activity may be reported to network operators so that they may further investigate the activity.

Figure 3:
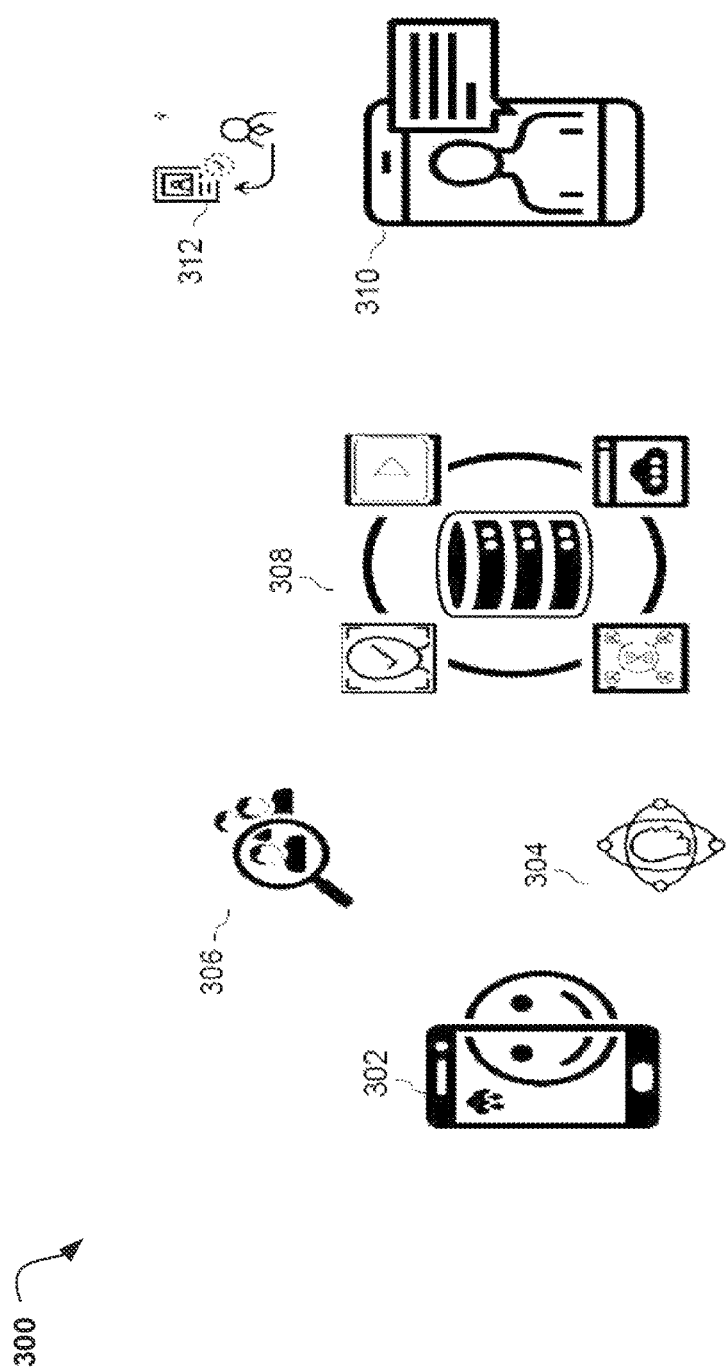
FIG. 3 is a diagram depicting an interaction between solution components of the process in FIGS. 2A and 2B according to at least one embodiment.

Referring now to FIG. 3, a diagram 300 depicting an interaction between solution components of the process in FIGS. 2A and 2B is shown according to at least one embodiment. In the diagram 300, the media transition 302 (i.e., the attempted sharing of an image file), is shown. A media interaction detector module (MIDM) 304 may be deployed as a functional module of a media transit monitor service (MTMS) 306, also referred to as the media transit management program 110A, 110B in the description of FIGS. 1 and 2A and 2B. The MIDM 304 may be responsible to monitor for any attempted sharing of the image file. According to at least one embodiment, the MTMS 306 may be integrated with the back-end infrastructure of network providers. For example, the MTMS 306 may be integrated with the back-end infrastructure of a social media platform or any other platform capable of displaying and/or sharing digital media. According to at least one other embodiment, the MTMS 306 may be deployed as an application programming interface (API) on the front-end infrastructure of network providers. The MTMS 306 may communicate with a secured image data repository (SIDR) 308, also referred to as the database 116 in the description of FIGS. 1 and 2A and 2B. The SIDR 308 may store the metadata associated with the one or more received images, the participating user profile, and/or the one or more pre-set configuration criteria. The participating user may sign-up 312 via the SRP described above with respect to FIGS. 2A and 2B. During sign-up 312, the participating user may create their profile and the profile may contain the pre-set configuration criteria as well as contact information for the participating user to receive an alert 310, also referred to as the notification in the description of FIGS. 2A and 2B, regarding the sharing activity. The contact information may be a phone number, e-mail address, instant messaging (IM) address, and/or any other contact information that may be used to send the alert 310 to the participating user. As described above with respect to FIGS. 2A and 2B, the alert 310 may include details of the sharing activity by the at least one other user, including, but not limited to, the identity of the at least one other user, the particular image file being shared, and/or the platform with which the image file will be shared.

Figure 4:
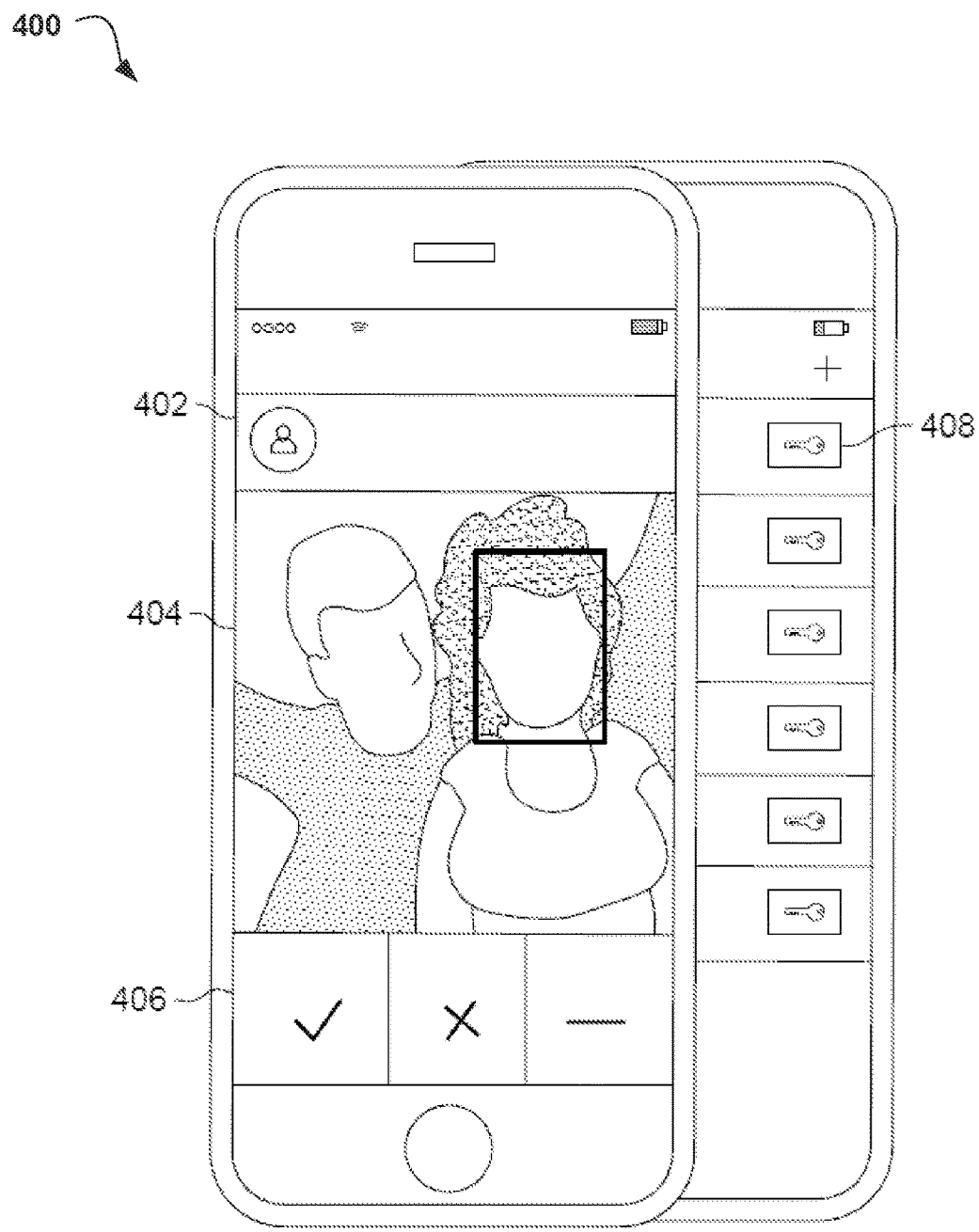
FIG. 4 is a diagram depicting a graphical user interface (GUI) on a client computing device according to at least one embodiment.

Referring now to FIG. 4, a diagram 400 depicting a GUI on the client computing device 102 (FIG. 1) is shown according to at least one embodiment. The GUI may display the details of the sharing activity 402 described above with respect to FIG. 3, and the actual image file 404 attempted to be shared by the at least one other user. The GUI may also display a plurality of options 406 to the participating user. These plurality of options may include, but are not limited to, an option to accept the attempted sharing of the image file, an option to deny the attempted sharing of the image file, and an option to choose that the image file does not belong to the participating user. According to at least one embodiment, the GUI may also display the one or more pre-set configuration criteria 408 to the participating user. The participating user may tap on the one or more pre-set configuration criteria 408 to update the criteria at any time.

It may be appreciated that FIGS. 2A-2B and 3-4 provide only an illustration of one implementation and do not imply any limitations with regard to how different embodiments may be implemented. Many modifications to the depicted environments may be made based on design and implementation requirements.

Figure 5:
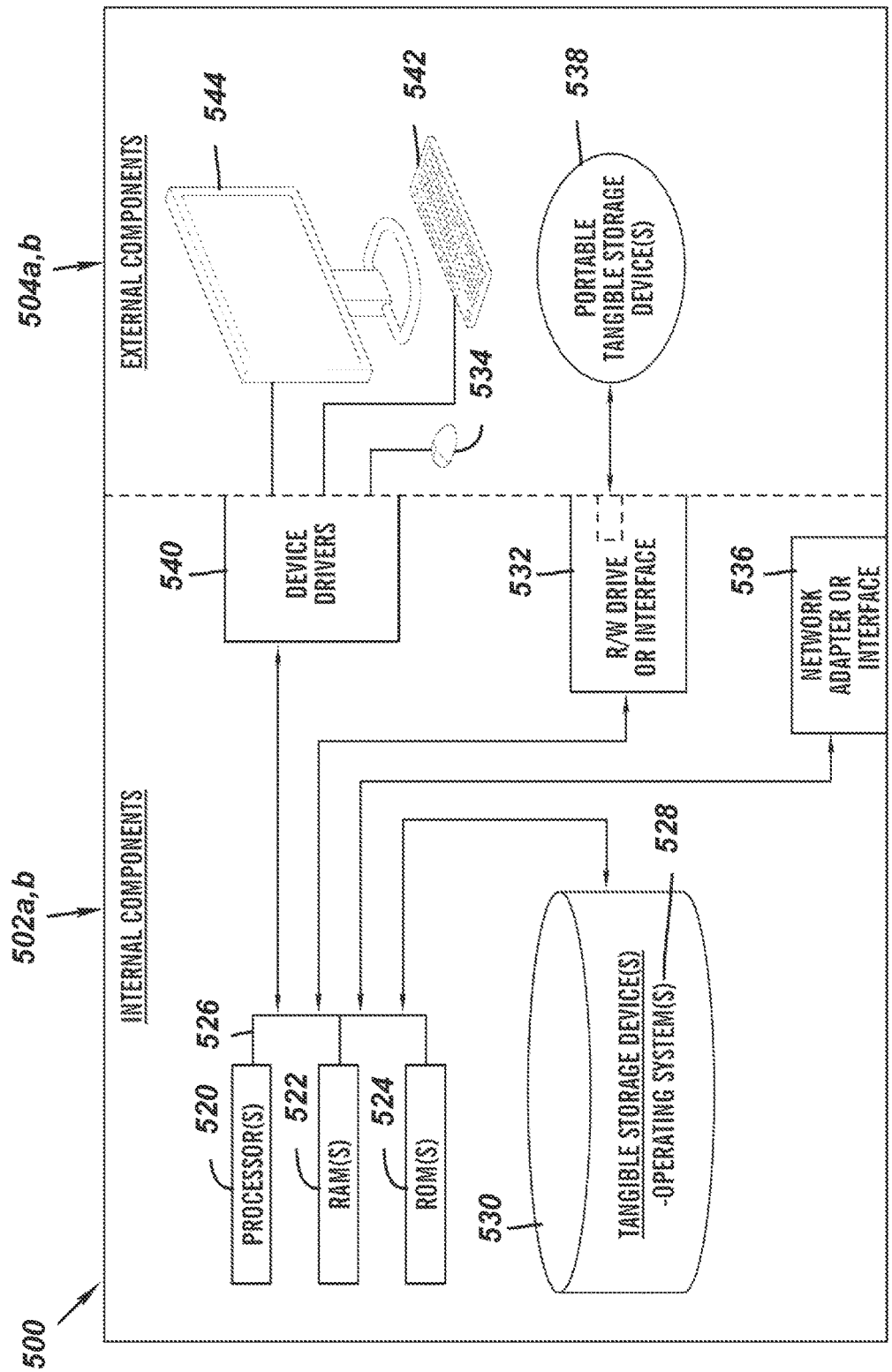
FIG. 5 is a functional block diagram of internal and external components of computers and servers depicted in FIG. 1 according to at least one embodiment.

FIG. 5 is a block diagram 500 of internal and external components of the client computing device 102 and the server 112 depicted in FIG. 1 in accordance with an embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

The data processing system 502, 504 is representative of any electronic device capable of executing machine-readable program instructions. The data processing system 502, 504 may be representative of a smart phone, a computer system, PDA, or other electronic devices. Examples of computing systems, environments, and/or configurations that may represented by the data processing system 502, 504 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 502 a,b and external components 504 a,b illustrated in FIG. 5. Each of the sets of internal components 502 include one or more processors 520, one or more computer-readable RAMs 522, and one or more computer-readable ROMs 524 on one or more buses 526, and one or more operating systems 528 and one or more computer-readable tangible storage devices 530. The one or more operating systems 528, the software program 108 and the media transit management program 110A in the client computing device 102 and the media transit management program 110B in the server 112 are stored on one or more of the respective computer-readable tangible storage devices 530 for execution by one or more of the respective processors 520 via one or more of the respective RAMs 522 (which typically include cache memory). In the embodiment illustrated in FIG. 5, each of the computer-readable tangible storage devices 530 is a magnetic disk storage device of an internal hard drive. Alternatively, each of the computer-readable tangible storage devices 530 is a semiconductor storage device such as ROM 524, EPROM, flash memory or any other computer-readable tangible storage device that can store a computer program and digital information.

Each set of internal components 502 a,b also includes a R/W drive or interface 532 to read from and write to one or more portable computer-readable tangible storage devices 538 such as a CD-ROM, DVD, memory stick, magnetic tape, magnetic disk, optical disk or semiconductor storage device. A software program, such as the media transit management program 110A, 110B, can be stored on one or more of the respective portable computer-readable tangible storage devices 538, read via the respective R/W drive or interface 532, and loaded into the respective hard drive 530.

Each set of internal components 502 *a,b* also includes network adapters or interfaces 536 such as a TCP/IP adapter cards, wireless Wi-Fi interface cards, or 3G or 4G wireless interface cards or other wired or wireless communication links. The software program 108 and the media transit management program 110A in the client computing device 102 and the media transit management program 110B in the server 112 can be downloaded to the client computing device 102 and the server 112 from an external computer via a network (for example, the Internet, a local area network or other, wide area network) and respective network adapters or interfaces 536. From the network adapters or interfaces 536, the software program 108 and the media transit management program 110A in the client computing device 102 and the media transit management program 110B in the server 112 are loaded into the respective hard drive 530. The network may comprise copper wires, optical fibers, wireless transmission, routers, firewalls, switches, gateway computers and/or edge servers.

Each of the sets of external components 504 *a,b* can include a computer display monitor 544, a keyboard 542, and a computer mouse 534. External components 504 *a,b* can also include touch screens, virtual keyboards, touch pads, pointing devices, and other human interface devices. Each of the sets of internal components 502 *a,b* also includes device drivers 540 to interface to computer display monitor 544, keyboard 542, and computer mouse 534. The device drivers 540, R/W drive or interface 532, and network adapter or interface 536 comprise hardware and software (stored in storage device 530 and/or ROM 524).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
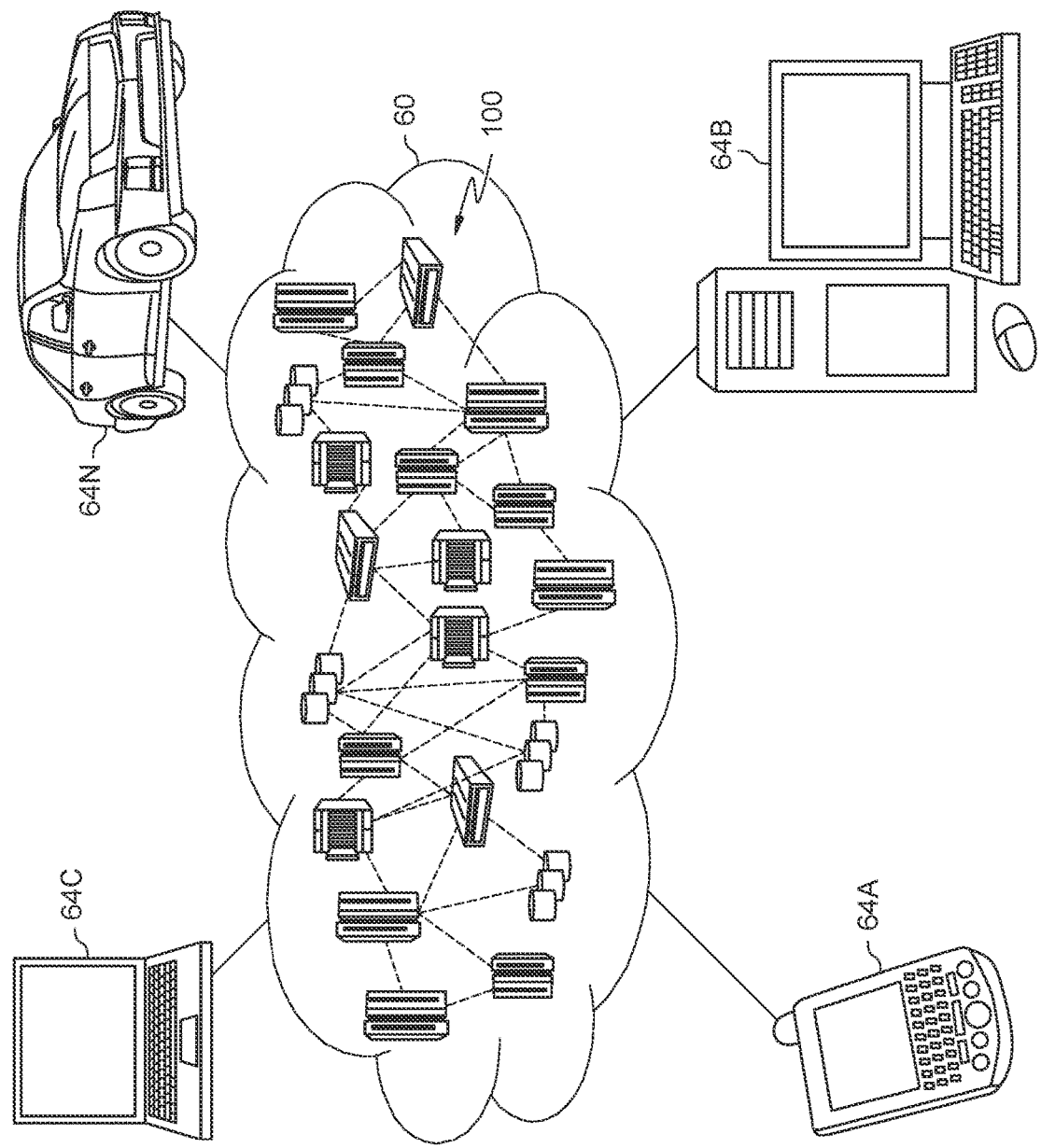
FIG. 6 depicts a cloud computing environment according to an embodiment of the present invention.

Referring now to FIG. 6, illustrative cloud computing environment 60 is depicted. As shown, cloud computing environment 60 comprises one or more cloud computing nodes 100 with which local computing devices used by cloud consumers, such as, for example, personal digital assistant (PDA) or cellular telephone 64A, desktop computer 64B, laptop computer 64C, and/or automobile computer system 64N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 60 to offer infrastructure, platforms and/or software as services for which a cloud consumer does not need to maintain resources on a local computing device. It is understood that the types of computing devices 64A-N shown in FIG. 6 are intended to be illustrative only and that computing nodes 100 and cloud computing environment 60 can communicate with any type of computerized device over any type of network and/or network addressable connection (e.g., using a web browser).

Figure 7:
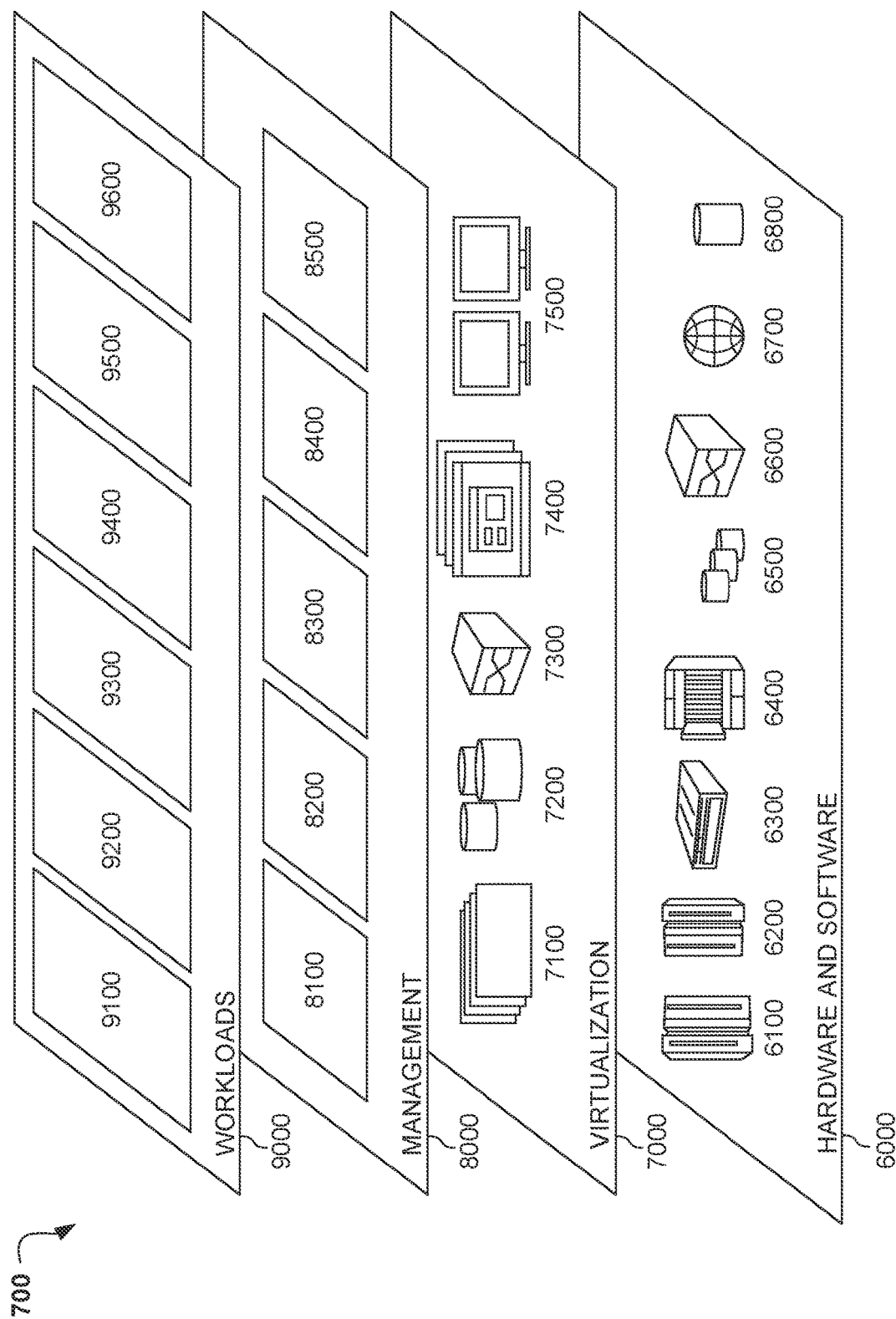
FIG. 7 depicts abstraction model layers according to an embodiment of the present invention.

Referring now to FIG. 7, a set of functional abstraction layers 700 provided by cloud computing environment 60 is shown. It should be understood in advance that the components, layers, and functions shown in FIG. 7 are intended to be illustrative only and embodiments of the invention are not limited thereto. As depicted, the following layers and corresponding functions are provided:

Hardware and software layer 6000 includes hardware and software components. Examples of hardware components include: mainframes 6100; RISC (Reduced Instruction Set Computer) architecture based servers 6200; servers 6300; blade servers 6400; storage devices 6500; and networks and networking components 6600. In some embodiments, software components include network application server software 6700 and database software 6800.

Virtualization layer 7000 provides an abstraction layer from which the following examples of virtual entities may be provided: virtual servers 7100; virtual storage 7200; virtual networks 7300, including virtual private networks; virtual applications and operating systems 7400; and virtual clients 7500.

In one example, management layer 8000 may provide the functions described below. Resource provisioning 8100 provides dynamic procurement of computing resources and other resources that are utilized to perform tasks within the cloud computing environment. Metering and Pricing 8200 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 8300 provides access to the cloud computing environment for consumers and system administrators. Service level management 8400 provides cloud computing resource allocation and management such that required service levels are met. Service Level Agreement (SLA) planning and fulfillment 8500 provide pre-arrangement for, and procurement of, cloud computing resources for which a future requirement is anticipated in accordance with an SLA.

Workloads layer 9000 provides examples of functionality for which the cloud computing environment may be utilized. Examples of workloads and functions which may be provided from this layer include: mapping and navigation 9100; software development and lifecycle management 9200; virtual classroom education delivery 9300; data analytics processing 9400; transaction processing 9500; and media transit management in cyberspace 9600. Media transit management in cyberspace 9600 may relate to receiving a pre-set configuration from a participating user regarding management of an image file in order to notify the participating user of an attempt by at least one other user to share the image file if the image file does not meet the pre-set configuration criteria.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method of managing media transit in cyberspace, the method comprising:
　receiving, from a participating user, one or more images and one or more pre-set configuration criteria regarding management of an image file, the one or more images containing objects and metadata including at least a time stamp and location where the one or more images were captured;
　receiving a request from the participating user to monitor for an attempted sharing of the image file by at least one other user;
　monitoring for the attempted sharing of the image file in response to receiving the request from the participating user;
　determining whether each object in the one or more images matches each object in the image file and whether the time stamp and location of the one or more images match a time stamp and location of the image file; and
　in response to determining each object in the one or more images matches each object in the image file and the time stamp and location of the one or more images match the time stamp and location of the image file:
　　identifying the at least one other user who is attempting to share the image file; and
　　correlating the one or more pre-set configuration criteria with the image file.

2. The method of claim 1, further comprising:
　determining whether the at least one other user is authorized to share the image file based on the one or more pre-set configuration criteria; and
　in response to determining the at least one other user is not authorized to share the image file, analyzing the one or more pre-set configuration criteria correlated with the image file.

3. The method of claim 2, further comprising:
　determining whether the image file meets the one or more pre-set configuration criteria for sharing by the at least one other user based on the analysis of the one or more pre-set configuration criteria correlated with the image file;
　in response to determining the image file does not meet the one or more pre-set configuration criteria for sharing, prompting the participating user to respond to a notification regarding the attempted sharing; and sending the at least one other user a response of the participating user.

4. The method of claim 3, wherein the pre-set configuration is selected from a group consisting of blocking the attempted sharing if the image file was captured in a public place, blocking the attempted sharing if the image file was not captured by a known device, allowing the attempted sharing if the at least one other user is in a contact list of the participating user, and allowing the attempted sharing only after approval is granted by the participating user.

5. The method of claim 3, wherein the metadata associated with the one or more images is stored in a database.

6. The method of claim 3, wherein the notification is presented via a graphical user interface (GUI), the GUI displaying an option to accept the attempted sharing of the image file, an option to deny the attempted sharing of the image file, and an option to choose that the participating user is not in the image file.

7. The method of claim 3, wherein the one or more images are obtained from a social media account of the participating user.

8. A computer system, the computer system comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
receiving, from a participating user, one or more images and one or more pre-set configuration criteria regarding management of an image file, the one or more images containing objects and metadata including at least a time stamp and location where the one or more images were captured;
receiving a request from the participating user to monitor for an attempted sharing of the image file by at least one other user;
monitoring for the attempted sharing of the image file in response to receiving the request from the participating user;
determining whether each object in the one or more images matches each object in the image file and whether the time stamp and location of the one or more images match a time stamp and location of the image file; and
in response to determining each object in the one or more images matches each object in the image file and the time stamp and location of the one or more images match the time stamp and location of the image file:
identifying the at least one other user who is attempting to share the image file; and
correlating the one or more pre-set configuration criteria with the image file.

9. The computer system of claim 8, further comprising:
determining whether the at least one other user is authorized to share the image file based on the one or more pre-set configuration criteria; and
in response to determining the at least one other user is not authorized to share the image file, analyzing the one or more pre-set configuration criteria correlated with the image file.

10. The computer system of claim 9, further comprising:
determining whether the image file meets the one or more pre-set configuration criteria for sharing by the at least one other user based on the analysis of the one or more pre-set configuration criteria correlated with the image file;
in response to determining the image file does not meet the one or more pre-set configuration criteria for sharing, prompting the participating user to respond to a notification regarding the attempted sharing; and
sending the at least one other user a response of the participating user.

11. The computer system of claim 10, wherein the pre-set configuration is selected from a group consisting of blocking the attempted sharing if the image file was captured in a public place, blocking the attempted sharing if the image file was not captured by a known device, allowing the attempted sharing if the at least one other user is in a contact list of the participating user, and allowing the attempted sharing only after approval is granted by the participating user.

12. The computer system of claim 10, wherein the metadata associated with the one or more images is stored in a database.

13. The computer system of claim 10, wherein the notification is presented via a graphical user interface (GUI), the GUI displaying an option to accept the attempted sharing of the image file, an option to deny the attempted sharing of the image file, and an option to choose that the participating user is not in the image file.

14. The computer system of claim 10, wherein the one or more images are obtained from a social media account of the participating user.

15. A computer program product, the computer program product comprising:
one or more computer-readable tangible storage medium and program instructions stored on at least one of the one or more tangible storage medium, the program instructions executable by a processor capable of performing a method, the method comprising:
receiving, from a participating user, one or more images and one or more pre-set configuration criteria regarding management of an image file, the one or more images containing objects and metadata including at least a time stamp and location where the one or more images were captured;
receiving a request from the participating user to monitor for an attempted sharing of the image file by at least one other user;
monitoring for the attempted sharing of the image file in response to receiving the request from the participating user;
determining whether each object in the one or more images matches each object in the image file and whether the time stamp and location of the one or more images match a time stamp and location of the image file; and
in response to determining each object in the one or more images matches each object in the image file and the time stamp and location of the one or more images match the time stamp and location of the image file:
identifying the at least one other user who is attempting to share the image file; and
correlating the one or more pre-set configuration criteria with the image file.

16. The computer program product of claim 15, further comprising:
   determining whether the at least one other user is authorized to share the image file based on the one or more pre-set configuration criteria; and
   in response to determining the at least one other user is not authorized to share the image file, analyzing the one or more pre-set configuration criteria correlated with the image file.

17. The computer program product of claim 16, further comprising:
   determining whether the image file meets the one or more pre-set configuration criteria for sharing by the at least one other user based on the analysis of the one or more pre-set configuration criteria correlated with the image file;
   in response to determining the image file does not meet the one or more pre-set configuration criteria for sharing, prompting the participating user to respond to a notification regarding the attempted sharing; and
   sending the at least one other user a response of the participating user.

18. The computer program product of claim 17, wherein the pre-set configuration is selected from a group consisting of blocking the attempted sharing if the image file was captured in a public place, blocking the attempted sharing if the image file was not captured by a known device, allowing the attempted sharing if the at least one other user is in a contact list of the participating user, and allowing the attempted sharing only after approval is granted by the participating user.

19. The computer program product of claim 17, wherein the metadata associated with the one or more images is stored in a database.

20. The computer program product of claim 17, wherein the notification is presented via a graphical user interface (GUI), the GUI displaying an option to accept the attempted sharing of the image file, an option to deny the attempted sharing of the image file, and an option to choose that the participating user is not in the image file.

* * * * *